United States Patent [19]
Tan et al.

[11] Patent Number: 6,078,920
[45] Date of Patent: Jun. 20, 2000

[54] COMPUTER PROGRAM PRODUCT AND APPARATUS FOR RETRIEVAL OF OLE ENABLED BLOBS FROM AN RDBMS SERVER

[75] Inventors: Shih-Shan Tan, San Jose; Jenny Yukkoo Nishimura, Campbell, both of Calif.

[73] Assignee: International Business Machines Corporation, Armonk, N.Y.

[21] Appl. No.: 09/015,437

[22] Filed: Jan. 29, 1998

[51] Int. Cl.[7] .................................................. G06F 17/30
[52] U.S. Cl. .................. 707/10; 707/4; 707/102; 707/103; 395/200.33; 395/200.47; 395/710
[58] Field of Search .................. 707/10, 103, 4, 707/102, 3; 395/200.33, 200.38, 200.47, 710

[56] References Cited

U.S. PATENT DOCUMENTS

| | | | |
|---|---|---|---|
| 5,499,359 | 3/1996 | Vijaykumar | 707/201 |
| 5,561,793 | 10/1996 | Bennett et al. | 707/201 |
| 5,603,025 | 2/1997 | Tabb et al. | 707/2 |
| 5,615,367 | 3/1997 | Bennett et al. | 707/102 |
| 5,682,524 | 10/1997 | Freund et al. | 711/5 |
| 5,713,014 | 1/1998 | Durflinger et al. | 707/4 |
| 5,745,896 | 4/1998 | Vijaykumar | 707/100 |
| 5,752,027 | 5/1998 | Familiar | 707/103 |
| 5,781,910 | 7/1998 | Gostanian et al. | 707/201 |
| 5,796,393 | 8/1998 | MacNaughton et al. | 345/329 |
| 5,809,497 | 9/1998 | Freund et al. | 707/2 |
| 5,857,201 | 1/1999 | Wright, Jr. et al. | 707/104 |
| 5,873,083 | 2/1999 | Jones et al. | 707/4 |
| 5,892,909 | 4/1999 | Grasso et al. | 709/201 |
| 5,974,416 | 10/1999 | Anand et al. | 707/10 |
| 5,991,776 | 11/1999 | Bennett et al. | 707/205 |

OTHER PUBLICATIONS

R. Finkelstein, "ODBC:Beware the Hype", Network Computing, pp. CS3–CS4, Jan. 15, 1994.

*Primary Examiner*—Jean R. Homere
*Attorney, Agent, or Firm*—Kudirka & Jobse, LLP

[57] ABSTRACT

A computer-implemented method, apparatus, and article of manufacture for accessing database objects. A server computer executes a first database management system, wherein the first database management system manages a first database and the database objects are stored in the first database. Preferably, the first database management system is a DB2 RDBMS. A client computer, which is connected to the server computer, executes a second database management system, wherein the second database management system manages a second database and the database objects stored in the first database are activated or linked to the original database objects stored in the second database management system. Preferably, the second database management system is an APPROACH RDBMS. The first database management system communicates with the second database management system via an Open Database Connectivity (ODBC) connection between the connected client computer and server computer. The database objects stored in the first database are OLE objects, which are activated or linked to the original database objects stored in the second database and accessed across the ODBC connection. The database objects stored in the first database are Binary Large OBjects (BLOBs).

14 Claims, 7 Drawing Sheets

COMPUTER PROGRAM PRODUCT AND APPARATUS FOR RETRIEVAL OF OLE ENABLED BLOBS FROM AN RDBMS SERVER

BACKGROUND OF THE INVENTION

1. Field of the Invention

This invention relates in general to database management systems performed by computers, and in particular, to the optimization of queries in a database management system that supports extended search capabilities such as relational extenders.

2. Description of the Related Art

Computers are increasingly being used in client-server configurations. In a client-server configuration, multiple computers are interconnected by a communication network, wherein certain computers perform client functions and other computers perform server functions. A client computer generates requests and a server computer processes the client's requests. A particular computer can be at times a client and at other times a server.

One application of the client-server architecture is a relational database management system (RDBMS). For example, many businesses have large database management systems on their server computers, wherein the systems contain information on their business, their customers, their competitors, etc. Similarly, many users have smaller database management systems on their client computers, wherein the database systems contain information relevant to the user. Often, there is a need for linking the database management systems performed by the client and server computers, and sharing information therebetween.

The principal advantages of the client-server architecture include the distribution and sharing of resources such as databases. The client-server architecture also makes it possible to keep a centralized database on the server computer, which is shared among many client computers, rather than trying to maintain multiple copies of the database on multiple computers.

Furthermore, recent development of industry standards have made such distributed systems possible. One such standard is the Open Database Connectivity (ODBC) standard, promulgated by Microsoft Corporation, which provides a standard database access application programming interface (API). Nonetheless, there is a need in the art for improved methods of linking database management systems performed by client and server systems.

SUMMARY OF THE INVENTION

To address the requirements described above, the present invention discloses a computer-implemented method, apparatus, and article of manufacture for accessing database objects. A server computer executes a first database management system, wherein the first database management system manages a first database and the database objects are stored in the first database. Preferably, the first database management system is a DB2 RDBMS. A client computer, which is connected to the server computer, executes a second database management system, wherein the second database management system manages a second database and the database objects stored in the first database are activated or linked to the original database objects stored in the second database management system. Preferably, the second database management system is an APPROACH RDBMS. The first database management system communicates with the second database management system via an Open Database Connectivity (ODBC) connection between the connected client computer and server computer. The database objects stored in the first database are OLE objects, which are activated or linked to the original database objects stored in the second database and accessed across the ODBC connection. The database objects stored in the first database are Binary Large OBjects (BLOBs).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention provides access to OLE objects that are stored in and retrieved from remote database management systems in a client-server architecture. More specifically, the present invention provides access to OLE objects that comprise Binary Large Objects (BLOBs), wherein the BLOBs are stored in a remote RDBMS server, are retrieved to a local RDBMS client, and the local RDBMS client calls on or interfaces to the object-originating application to manipulate the content of the BLOBs. Thus, the present invention allows users to build sophisticated applications, for example, applications that can manipulate BLOBs, such as text, images, video, audio, and other OLE objects.

In one embodiment of the present invention, a client-based relational database management system (RDBMS), such as the APPROACH™ product sold by Lotus Corporation, provides connectivity to a server-based RDBMS, such as the DB2™ product sold by IBM Corporation. Such access preferably occurs via OLE techniques in order to provide greater functionality for users of shared data.

Hardware Environment

Figure 1:
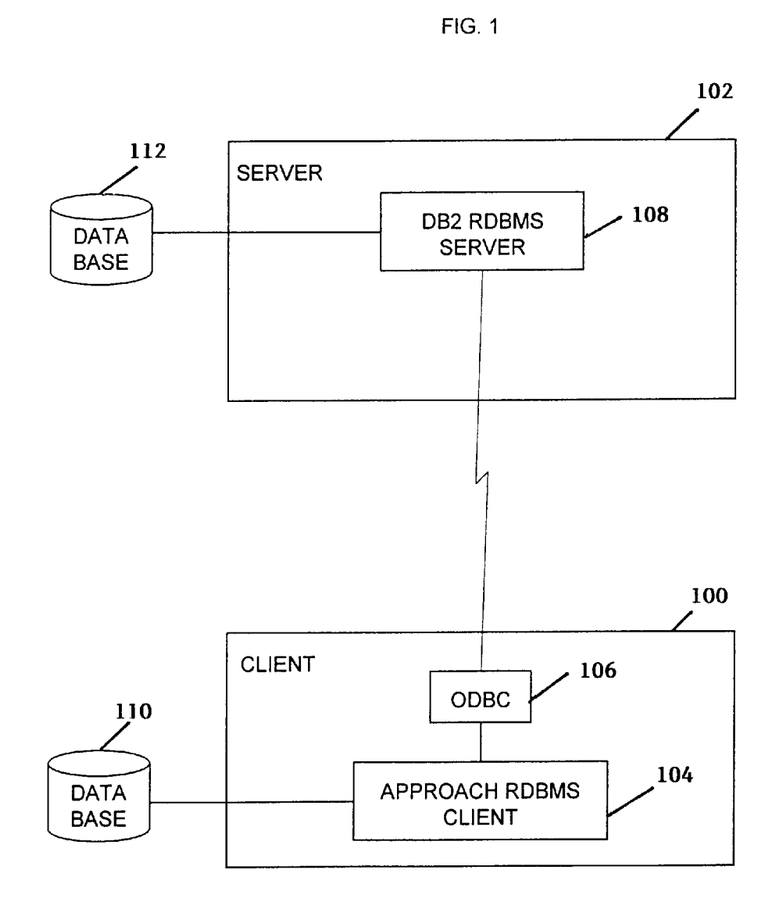
FIG. 1 is an exemplary hardware environment used to implement the preferred embodiment of the invention.

FIG. 1 is a block diagram illustrating an exemplary hardware environment used to implement the preferred embodiment of the invention. In the exemplary hardware environment, a client/server architecture is illustrated comprising a client computer 100 coupled to a server computer 102. Both the client computer 100 and server computer 102 may include, inter alia, processors, random access memory (RAM), fixed and/or removable data storage devices, data communications devices, and other components.

The present invention is typically implemented using relational database management system (RDBMS) software, such as the APPROACH™ product sold by Lotus Development Corporation and the DB2™ product sold by IBM Corporation, although it may be implemented with any database management system (DBMS) software. In the example illustrated herein, the RDBMS software includes APPROACH RDBMS client 104 and ODBC component software 106 executed by the client computer 100, and DB2 RDBMS server 108 executed by the server computer 102. These programs execute under the control of an operating system on their respective computers 100 or 102, such as OS/2, WINDOWS, AIX, MVS, UNIX, etc. Those skilled in the art will recognize that any combination of the above programs, or any number of different programs, may be used to implement the present invention.

The APPROACH RDBMS client 104 generates commands for performing various search and retrieval functions, termed queries, against either a local database 110 managed by the APPROACH RDBMS client 104 and/or a remote database 112 managed by the DB2 RDBMS server 108. The ODBC component 106 provides a standardized interface for communicating the commands and results between the client computer 100 and server computer 102.

Generally, the RDBMS client 104 and 108 and the ODBC component 106 are tangibly embodied in or readable from a computer-readable medium, e.g. one or more data storage devices and/or a remote device coupled to the client computer 100 or server computer 102 via data communications devices. These software components each comprise instructions which, when read and executed by the client computer 100 and/or server computer 102, cause the computers to perform the steps necessary to execute the steps or elements of the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that any combination of the above components, or any number of different components, peripherals, and other devices, may be used in accomplishing the present invention. Those skilled in the art will also recognize that the present invention may be implemented on a single computer, rather than multiple computers networked together.

Operation of the Relational Database Management Systems

The operation of the present invention is further illustrated using illustrations of a graphical user interface (GUI) provided by the APPROACH RDBMS client 104 in FIGS. 2A, 2B, 2C, and 2D. Of course, those skilled in the art will recognize that the use of specific GUIs is merely a design choice, and other GUIs could be used without departing from the scope of the present invention.

Figure 2A:
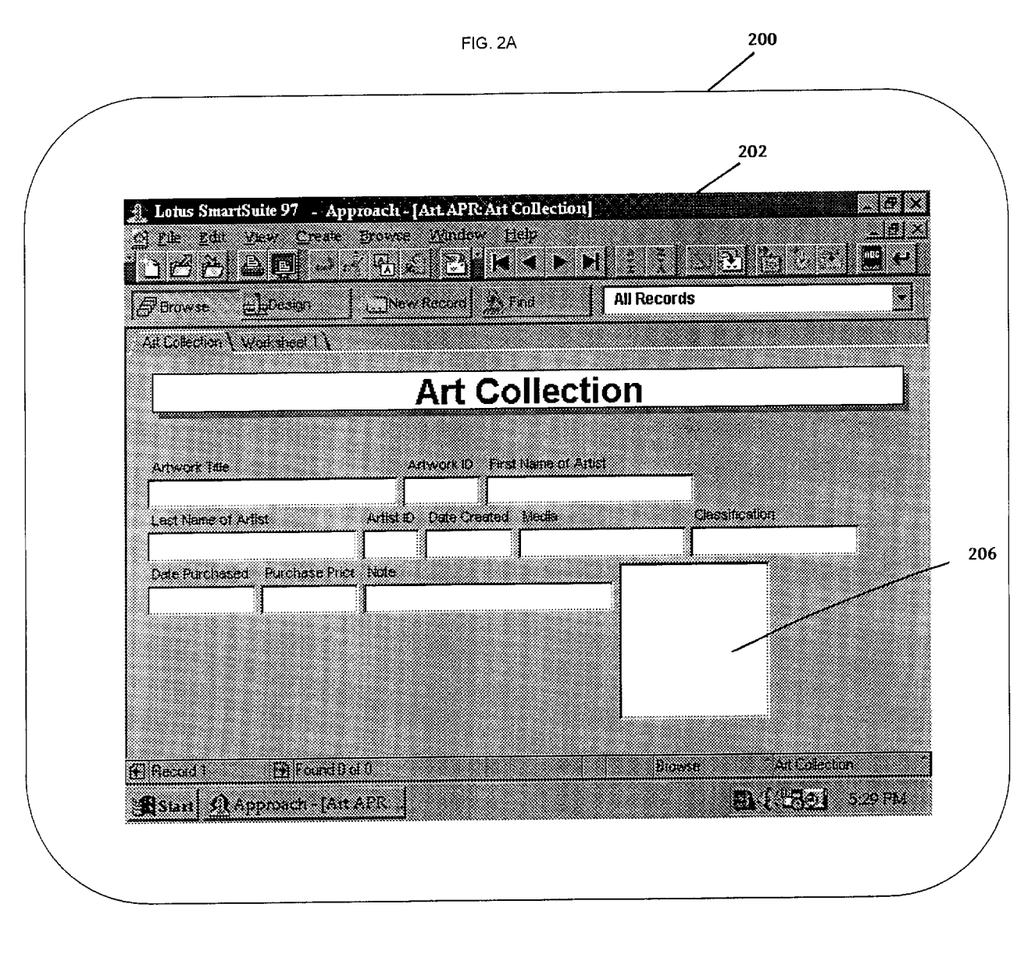
FIGS. 2A–2D illustrate a graphical user interface (GUI) displayed on a monitor according to the present invention.

In the present invention, the APPROACH RDBMS client 104 provides the user interface for the local database 110 and/or remote database 112. In a preferred embodiment, a user enters data in fill-in-the-blank style forms, and the APPROACH RDBMS client 104 either saves the information in the local database 110 and/or transfers the information to the DB2 RDBMS server 108 for storage into the remote database 112. The same forms can be used to retrieve and edit records that already are in the local databases 110 or remote databases 112. Further, a user can browse through all the records or look up a specific record in the local databases 110 or remote database 112.

Figure 2B:
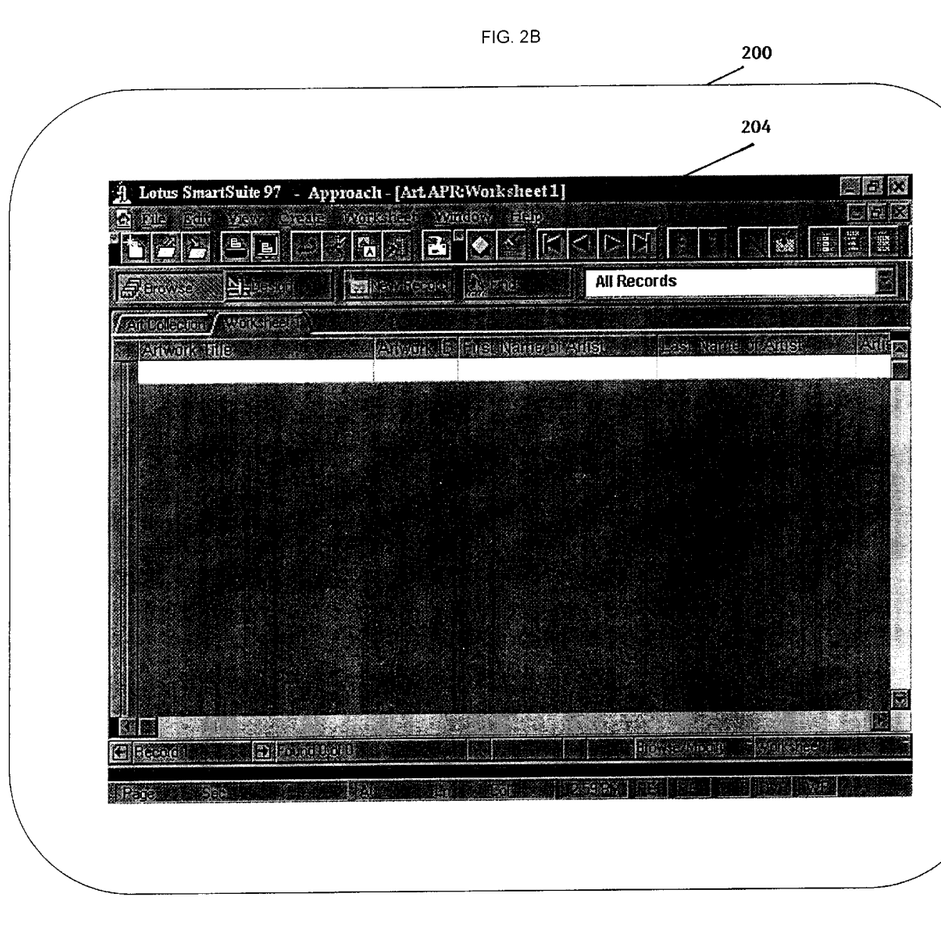

The form shown in FIG. 2A is an Art Collection form for data entry and retrieval for an Art Collection database; the name Art Collection appears near the top of the form. Just above the name are two file-folder tabs, one containing the name of the form and the other labeled Worksheet 1. By clicking the Worksheet 1 tab, a corresponding table is displayed, as indicated in FIG. 2B. Similarly, clicking on the Art Collection tab, the Art Collection form is displayed again, as indicated in FIG. 2A.

Figure 2C:
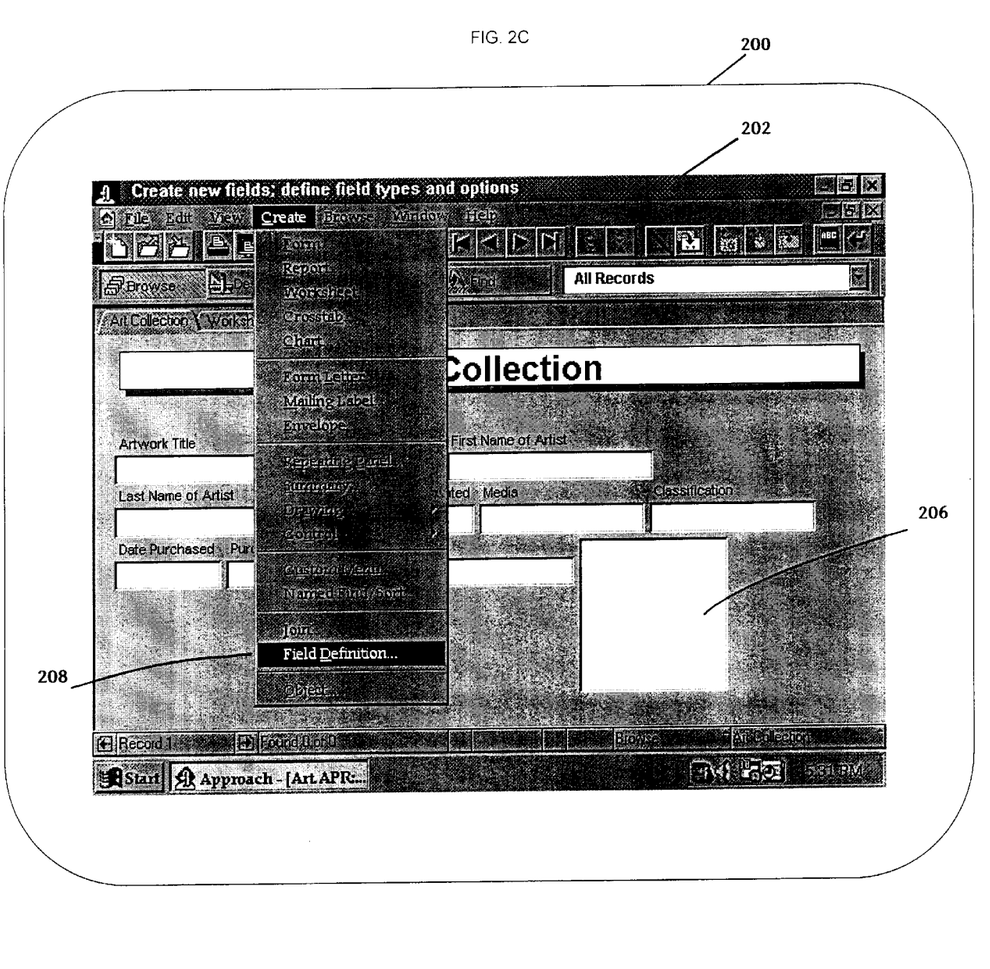
Figure 2D:
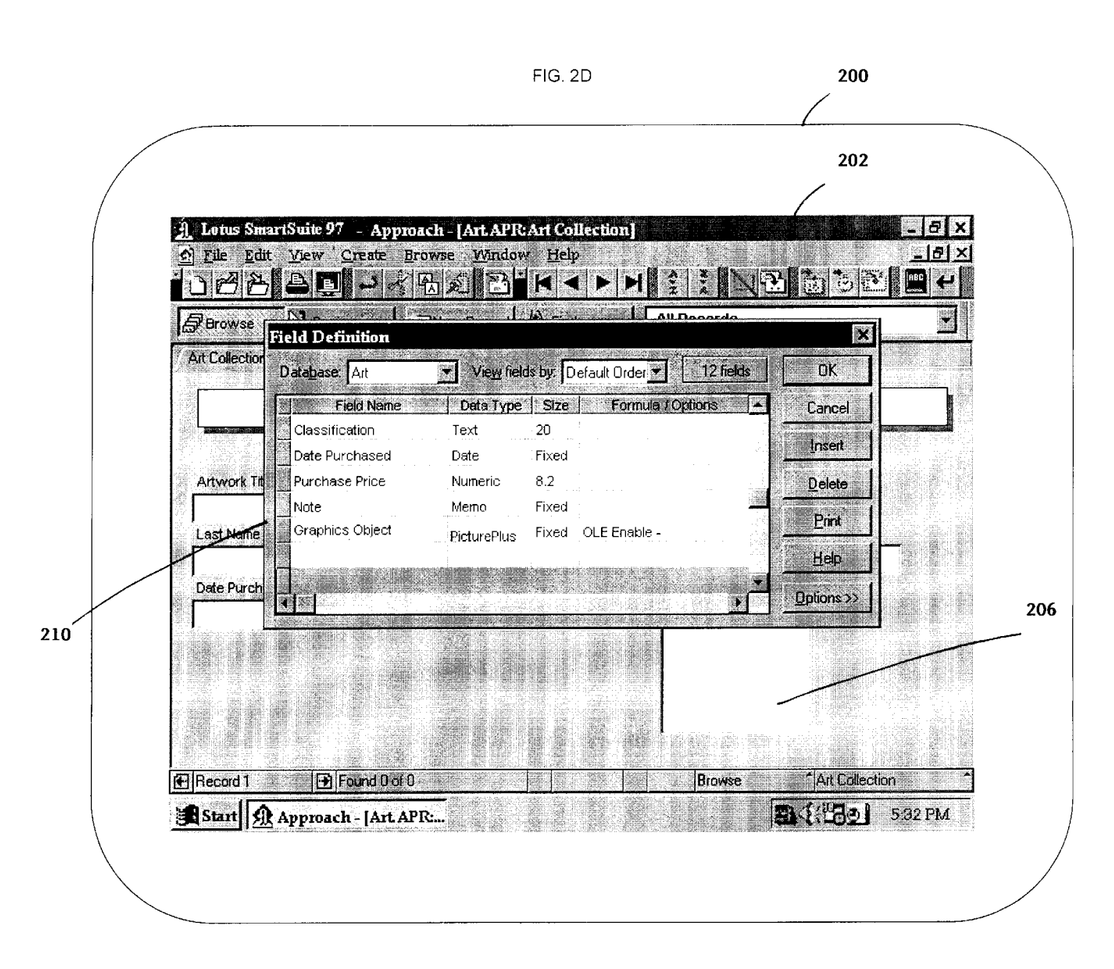

The first step in creating a database is creating a form in the APPROACH RDBMS client 104 and defining one or more fields in the form. To define the fields, the following steps are performed by the user at FIGS. 2C and 2D:

1. Enter the field name as it is to appear on the entry form, and then press the Tab key to move to the Data Type entry field.
2. Click the arrow to display a pop-up list of data types. The most commonly used data types are:
   Date (in the form MM/DD/YY);
   Numeric (numbers, currency, and decimals);
   Text (names and descriptions);
   Boolean (yes/no or true/false);
   Time (in HH:MM:SS format);
   Memo (for long text descriptions);
   PicturePlus (for OLE objects such as an embedded spreadsheet, word processing document, calendar control, media clip, MIDI sequence, hypertext document, paintbrush picture, audio object, video object, etc.);
   Calculated (for results of an equation).
3. Select the appropriate data type, and then press the Tab key to move to the Size field. In the present invention, the appropriate data type for the field 206 is PicturePlus, which indicates an OLE enabled object field.
4. Enter a size (number of bytes) for the field. A text field can have up to 255 bytes and a numeric field up to 19 bytes (including numbers on both sides of the decimal point). For a numeric field, enter the number of digits to the left of the decimal point, a point, and the number of digits to the right of the decimal point (for example, 10.2).
5. When entry is complete, tab to the next blank line, or click Insert. Then, a user can begin defining the next field.

A user can add fields to an existing form and database by choosing the Create, Field Definition menu item 208, as shown in FIG. 2C. The APPROACH RDBMS client 104 then displays a Field Definition dialog box 210, as shown in FIG. 2D, which works identically to the Creating New Database dialog box.

The APPROACH RDBMS client 104 creates its own local database 110 in which to store the information it needs. The APPROACH RDBMS client 104 can also access the remote database 112 by connecting to Open Database Connectivity (ODBC) data sources such as the DB2 RDBMS server 108.

Using PicturePlus fields 206, the APPROACH RDBMS client 104 enables a user to add BLOBs created and/or stored in the remote database 112. To insert an OLE object into the field 206 of a record in the remote database 112 as a BLOB, the user must perform the following steps:

1. Using the APPROACH RDBMS client 104, open the ODBC data sources and select the DB2 RDBMS server 108.
2. Using the APPROACH RDBMS client 104 and DB2 RDBMS server 108, create or open a table, which has one or more PicturePlus field(s), and then copy an OLE object to the clipboard of the APPROACH RDBMS client 104.
3. Select a field 206 having PicturePlus as its data type within a form created using the APPROACH RDBMS client 104 to receive the OLE object, as described above.
4. Choose the Edit/Paste Special menu item to paste the OLE object to the PicturePlus field 206. Thereafter, an OLE-enabled PicturePlus appears as an object in the form.

Once the OLE object is linked to or embedded in the PicturePlus field 206 using the various Identifiers in this manner, retrieval of the record results in the APPROACH RDBMS client 104 formatting an ODBC request using the various Identifiers and transmitting that request to the DB2 RDBMS server 108 via the ODBC component 106. After receiving the request, retrieval of the BLOB results in the DB2 RDBMS server 108 formatting an ODBC response and transmitting that response back to the APPROACH RDBMS client 104 via the ODBC component 106.

The APPROACH RDBMS client 104 then formats the retrieved BLOB as an OLE object for display in the field 206 in the data retrieval form. If the OLE object comprises text or an image, the APPROACH RDBMS client 104 displays the text or image (or its thumbnail) in the PicturePlus field 206 and the user can manipulate the OLE object through the OLE server. If the OLE object comprises audio or video, the APPROACH RDBMS client 104 displays an icon in the PicturePlus field 206 that a user can click on to execute and/or display the OLE object using the appropriate functionality.

Flowcharts

Figure 3A:
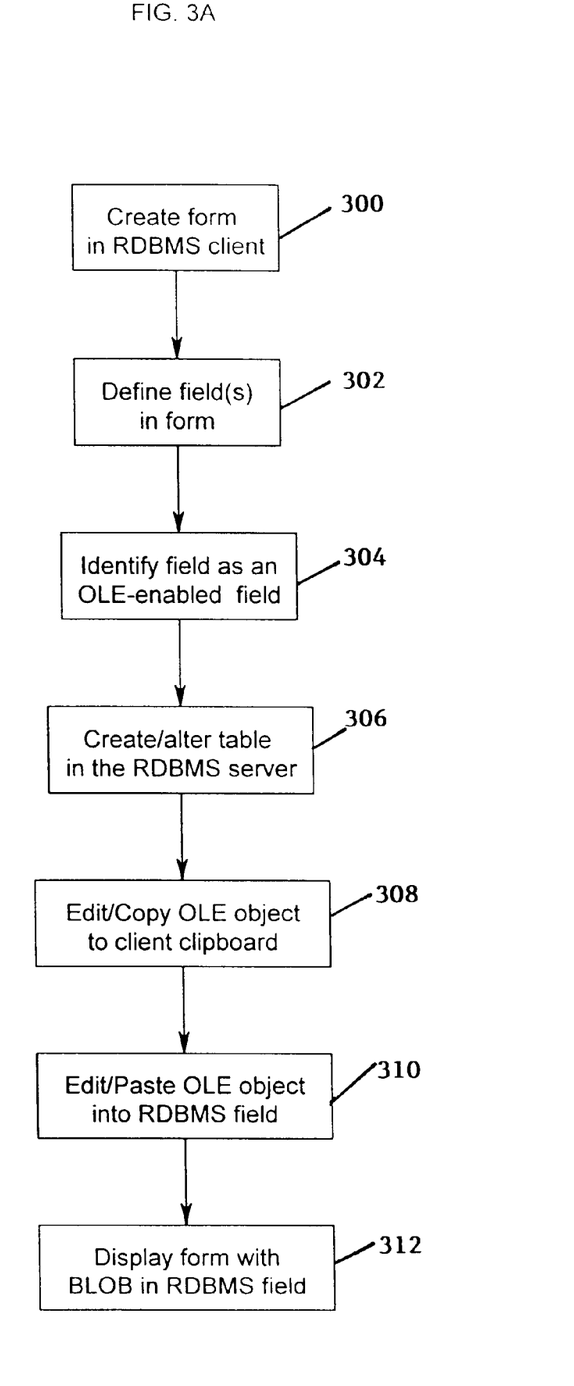
FIGS. 3A–3B are flowcharts that illustrates the general logic of the present invention.
Figure 3B:
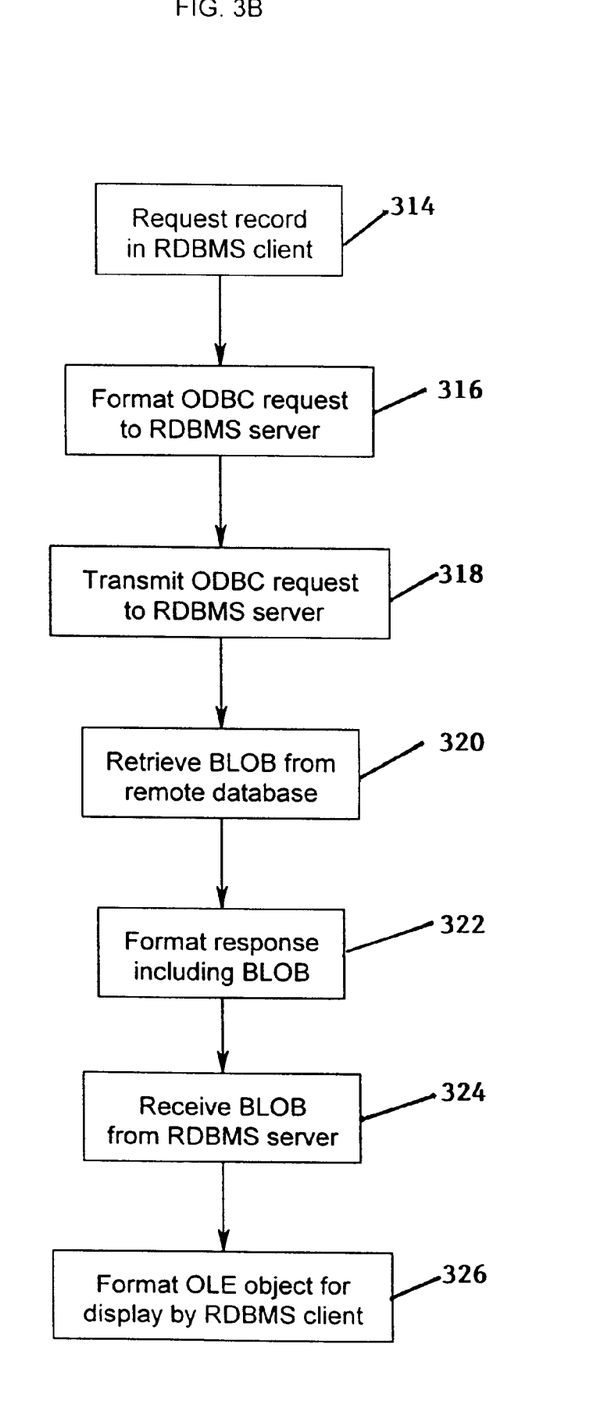

The logic of the present invention is further illustrated using the flowcharts in FIGS. 3A and 3B. Of course, those skilled in the art will recognize that the use of specific flowcharts and logic is merely a design choice, and other flowcharts and logic could be used without departing from the scope of the present invention.

Referring to FIG. 3A, Block 300 represents the APPROACH RDBMS client 104 creating the data entry and retrieval form. Block 302 represents the APPROACH RDBMS client 104 defining one or more fields in the data entry and retrieval form. Block 304 represents the APPROACH RDBMS client 104 identifying one or more of the fields in the data entry and retrieval form as an OLE enabled field (also known generically as an RDBMS field when used in conjunction with generic RDBMS servers). Block 306 represents the APPROACH RDBMS client 104 accessing a table in the DB2 RDBMS server 108 via ODBC component 106 in order to retrieve an OLE-enabled BLOB. Block 308 represents the APPROACH RDBMS client 104 copying the OLE object to the clipboard of the APPROACH RDBMS client 104. Block 310 represents the APPROACH RDBMS client 104 selecting a PicturePlus or RDBMS field and then choosing the Edit/Paste Special menu item to paste a link or embed the object into the field. Block 312 represents the APPROACH RDBMS client 104 displaying the form including the OLE-enabled BLOB in the field.

Referring to FIG. 3B, Block 306 of FIG. 3A is further defined with regard to connecting to the DB2 RDBMS server 108 via ODBC component 106 in order to retrieve an OLE-enabled BLOB. Block 316 represents the APPROACH RDBMS client 104 formatting an ODBC request and Block 318 represents the APPROACH RDBMS client 104 transmitting that request to the DB2 RDBMS server 108 via the ODBC component 106. After receiving the request, Block 320 represents the DB2 RDBMS server 108 retrieving the BLOB from the remote database 112 and Block 322 represents the DB2 RDBMS server 108 formatting an ODBC response including the BLOB. Block 324 represents the DB2 RDBMS server 108 transmitting the response back to the APPROACH RDBMS client 104 via the ODBC component 106. Block 326 represents the APPROACH RDBMS client 104 formatting the retrieved BLOB for display as an OLE object with the other fields in the data retrieval form.

Conclusion

This concludes the description of the preferred embodiment of the invention. The following describes some alternative embodiments for accomplishing the present invention.

For example, any combination of types of computers, such as mainframes, minicomputers, work stations, personal computers, or network computers, could be used in with the present invention. In addition, any software program, application or operating system performing database management functions could benefit from the present invention.

In summary, the present invention discloses a computer-implemented method, apparatus, and article of manufacture for accessing database objects. A server computer executes a first database management system, wherein the first database management system manages a first database and the database objects are stored in the first database. Preferably, the first database management system is a DB2 RDBMS. A client computer, which is connected to the server computer, executes a second database management system, wherein the second database management system manages a second database and the database objects stored in the first database are activated or linked to the original database objects stored in the second database management system. Preferably, the second database management system is an APPROACH RDBMS. The first database management system communicates with the second database management system via an Open Database Connectivity (ODBC) connection between the connected client computer and server computer. The database objects stored in the first database are OLE objects, which are activated or linked to the original database objects stored in the second database and accessed across the ODBC connection. The database objects stored in the first database are Binary Large OBjects (BLOBs).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a Relational Database Management System (RDBMS) client system operatively coupled to a RDBMS server system, a method comprising:

(a) receiving a request to create a retrieval form in the RDBMS client system, (b) receiving data defining selected fields in the retrieval form;

(c) receiving data identifying one of the fields as an Object Linking and Embedding (OLE)-enabled field;

(d) retrieving an OLE-enabled Binary Large Object (BLOB) from the RDBMS server system; and (e) displaying the OLE-enabled BLOB.

2. The method of claim 1 wherein step (e) further comprises the step of:

(e.1) copying the OLE object to a clipboard of the RDBMS client system.

3. The method of claim 2 wherein step (e) further comprises the step of:

(e.2) pasting the OLE object into an RDBMS field of the retrieval form.

4. The method of claim 1 wherein step (d) further comprises the step of:

(d.1) formatting a record request to the RDBMS server system into Open Database Connectivity (ODBC) format.

5. The method of claim 4 wherein step (d) further comprises the step of:

(d.2) transmitting the record request in ODBC format to the RDBMS server system.

6. The method of claim 5 wherein step (d) further comprises the step of:

(d.3) receiving an OLE-enabled BLOB from the RDBMS server system.

7. The method of claim 6 wherein step (d) further comprises the step of:

(d.4) formatting the OLE object for display by RDBMS client system.

8. A computer program product for use with a Relational Database Management System (RDBMS) client system operatively coupled to a RDBMS server system, the computer program product comprising a computer usable medium having computer usable program code comprising:

(a) program code configured to receive a request to create a retrieval form in the RDBMS client system;

(b) program code configured to receive data defining fields in the retrieval form;

(c) program code configured to receive data identifying one of the fields as an Object Linking and Embedding (OLE)-enabled field;

(d) program code configured to retrieve an OLE-enabled Binary Large Object (BLOB) from the RDBMS server system; and (e) program code configured to display the OLE-enabled BLOB.

9. The computer program product of claim 8 wherein (e) further comprises:

(e.1) program code configured to copy the OLE object to a clipboard of the RDBMS client system.

10. The computer program product of claim 9 wherein (e) further comprises:

(e.2) program code configured to paste the OLE object into an RDBMS field of the retrieval form.

11. The computer program product method of claim 8 wherein (d) further comprises:

(d.1) program code configured to format a record request to the RDBMS server system into Open Database Connectivity (ODBC) format.

12. The computer program product of claim 11 wherein step (d) further comprises:

(d.2) program code configured to transmit the record request in ODBC format to the RDBMS server system.

13. The computer program product of claim 12 wherein step (d) further comprises:

(d.3) program code configured to receive the OLE-enabled BLOB from the RDBMS server system.

14. The computer program product of claim 13 wherein step (d) further comprises:

(d.4) program code configured to format the OLE object for display by RDBMS client system.

* * * * *